3,097,067
PREPARATION OF IODINE PENTAFLUORIDE
Frank S. Fawcett and Alan L. McClelland, Wilmington, Del., assignors to E. I. du Pont de Nemours and Company, Wilmington, Del., a corporation of Delaware
No Drawing. Filed July 27, 1960, Ser. No. 45,533
1 Claim. (Cl. 23—205)

This invention relates to a new process for preparing iodine pentafluoride ($IF_5$) by fluorinating iodine pentoxide ($I_2O_5$) with carbonyl fluoride.

Inorganic fluorides are used in many well-known applications, such as metallurgy (fluxes), ceramics, pest control, catalysis, and as fluorinating agents in the production of organic fluorine compounds, such as in the well-known Swarts reaction. Improved methods for the preparation of inorganic fluorides are therefore being sought.

It has now been found that iodine pentafluoride can be prepared by reacting carbonyl fluoride ($COF_2$) with iodine pentoxide at a temperature of 100–300° C., preferably 100–200° C.

It is not necessary that the iodine pentoxide be highly refined for use in this invention, but for purposes of economy it should be anhydrous or substantially anhydrous. The iodine pentoxide is preferably used in a finely divided or highly porous state.

Carbonyl fluoride can be prepared by methods described in the literature. [See, for example, Ruff et al., Z. Anorg. Chem., 221, 154 (1934Q; Emeleus et al., J. Chem. Soc., 1948, 2185; U.S. 2,836,622.] Highly purified carbonyl fluoride is preferred but not required for the process of this invention, e.g. carbonyl fluoride containing a few percent of carbonyl chloride can be used.

One advantage of this invention is that the fluorine of the carbonyl fluoride is completely consumed in the formation of desirable inorganic fluorides; hence there is no wastage of valuable fluorinating agent in the formation of unattractive fluorine-containing coproducts. Another advantage resides in the fact that the coproducts are gaseous (e.g., $CO_2$) and generally can easily be completely separated from the main products.

Various procedures for carrying out this invention can be used. Iodine pentoxide can be contacted at the desired temperature with carbonyl fluoride by a batch process in a closed vessel under autogenous pressure, or by a continuous flow process in a hot tube or other suitable reactor. Pressures can vary from subatmospheric to superatmospheric. In a batch operation employing a closed vessel, the pressure is generally autogenous and will usually lie between about 50 atmospheres and 1,000 atmospheres or even higher. Although pressure is not critical, the rate of the reaction will vary, in some cases, directly with the pressure.

The inner surface of the reactor is preferably constructed of material which is resistant to attack by hydrogen fluoride or other corrosive components of the reactants or products involved in this invention. One suitable material for the inner surface of the reactor is the alloy "Hastelloy" (a trademark of the Haynes Stellite Company for its high strength nickel-base alloy which is resistant to corrosion). Other corrosion-resistant nickel alloys such as "Monel" and "Inconel" (both trademarks of the International Nickel Company) and still other materials such as stainless steel and copper can be used.

A bomb-type vessel provided with means for agitating, if desired, the reactants is used in a preferred process for carrying out this invention. The iodine pentoxide is charged into the vessel. The vessel is closed, cooled, and evacuated, then charged with the desired amount of carbonyl fluoride and, if desired, hydrogen fluoride (a catalyst), and the reaction mixture is heated as subsequently described.

Carbonyl fluoride is used at least in the amount required by the stoichiometry of the reaction but preferably in a two molar or even greater excess, i.e., the molar ratio of carbonyl fluoride to iodine pentoxide is 2.5:1 to 5:1 or even as high as 10:1. The excess carbonyl fluoride is easily recovered and can be reused.

Hydrogen fluoride, which is a promoter or catalyst for the reaction, may be employed in any desired amount and generally a 10 to 20 molar ratio with respect to the inorganic oxide or sulfide is used, but smaller or greater proportions can be used if desired. Essentially none of the hydrogen fluoride is consumed in the reaction, and it can be recovered for reuse if desired.

The minimum reaction time necessary to bring the reaction essentially to completion is dependent upon a number of variables including temperature, pressure and the presence or absence of catalysts or promoters, such as hydrogen fluoride. In a typical batch process as described above, the time can vary from about 30 minutes to 24 hours or even more.

The process of this invention can be accomplished in the presence of inert diluents, if desired. Suitable diluents are saturated aliphatic hydrocarbons, aromatic hydrocarbons, and highly fluorinated hydrocarbons, including perfluorinated hydrocarbons; examples are benzene, hexane, and perfluorocyclohexane.

Isolation of iodine pentafluoride after completion of the reaction can be accomplished by venting the gaseous coproducts with or without cooling of the reactor as desired, thus leaving less volatile fluorinated products, including $IF_5$, as a residue which is transferred to an inert storage vessel in an inert atmosphere for analysis and further purification as desired. The iodine pentafluoride can be purified by well-known procedures such as crystallization or distillation. Vented coproduct gases including unconsumed carbonyl fluoride and hydrogen fluoride can be collected for analysis and separation of valuable components (e.g., $COF_2$), if desired.

The process of the invention is more explicitly illustrated by the following example in which quantities of reactants are expressed in grams and volumes of reaction vessels are expressed in milliliters.

*Fluorination of Iodine Pentoxide*

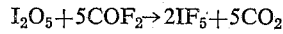

$$I_2O_5 + 5COF_2 \rightarrow 2IF_5 + 5CO_2$$

A 240-ml. "Hastelloy" C-lined shaker tube charged with 33 g. of $I_2O_5$ (0.1 mole) and 50 g. of carbonyl fluoride (0.76 mole) was heated at 100° C. for two hours, 150° C. for two hours, and 200° C. for 12 hours. The reactor was cooled, and the gaseous product, amounting to 45 g., was collected in a stainless steel cylinder cooled in liquid nitrogen. The non-volatile products, amounting to 34 g. of a purple-colored, fuming liquid, was distilled in a simple glass still to give 27 g. (61% of the theoretical yield) of a dark-colored, fluid iodine pentafluoride, identified by boiling point (103–104° C.) and n-m-r spectra. A few purple crystals, evidently free iodine, were present in the polyethylene container used to store the crude liquid product.

The gaseous product was passed at atmospheric pressure through a Dry Ice-cooled trap and was then condensed in a liquid nitrogen-cooled trap and returned to a stainless steel cylinder. Infrared analysis showed the gas to be largely $COF_2$ and $CO_2$, the latter in an amount corresponding to about 60% conversion.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

A process of preparing iodine pentafluoride which comprises reacting carbonyl fluoride with iodine pentoxide at a temperature of 100–300° C., the molar ratio of carbonyl fluoride to iodine pentoxide being 2.5:1 to 10:1.

References Cited in the file of this patent

UNITED STATES PATENTS

| | | |
|---|---|---|
| 2,068,005 | Daudt et al. | Jan. 19, 1937 |
| 2,811,413 | McMillan | Oct. 29, 1957 |
| 2,904,394 | Smith | Sept. 15, 1959 |
| 2,907,798 | Haszeldine et al. | Oct. 6, 1959 |
| 2,958,576 | Olstowski | Nov. 1, 1960 |
| 2,981,602 | Olah et al. | Apr. 25, 1961 |
| 3,043,662 | Lipscomb | July 10, 1962 |

OTHER REFERENCES

Mellor; Comprehensive Treatise on Inorganic and Theoretical Chemistry, vol. 5, pages 968–970 (1924), Longmans, Green and Co., New York, N.Y.